United States Patent [19]

Tonge

[11] Patent Number: 4,697,206

[45] Date of Patent: Sep. 29, 1987

[54] METHOD AND APPARATUS FOR ENHANCING VERTICAL CHROMINANCE RESOLUTION

[75] Inventor: Gary J. Tonge, Winchester, United Kingdom

[73] Assignee: Independent Broadcasting Authority, United Kingdom

[21] Appl. No.: 708,958

[22] PCT Filed: Jul. 9, 1984

[86] PCT No.: PCT/GB84/00245

§ 371 Date: Feb. 27, 1985

§ 102(e) Date: Feb. 27, 1085

[87] PCT Pub. No.: WO85/00493

PCT Pub. Date: Jan. 31, 1985

[30] Foreign Application Priority Data

Jul. 8, 1983 [GB] United Kingdom ............... 8318602

[51] Int. Cl.⁴ .......................................... H04N 11/08
[52] U.S. Cl. ........................................ 358/14; 358/40
[58] Field of Search ............................. 358/14, 12, 40

[56] References Cited

U.S. PATENT DOCUMENTS 2,273,172  2/1942  Beers ................... 358/242 X
4,210,927  7/1980  Yumde et al. ............ 358/12
4,516,151  5/1985  Stahler .................. 358/14

OTHER PUBLICATIONS

IBA Publication, "Line Sequential Colour Transmission and Vertical Filtering in MAC", G. Tonge et al, Dec. 1983.
"An Extensible Family of Standards"; E. J. Wilson & G. Tonge; pp. 13 and 14; Mar. 1982: IBA Technical Review No. 16.

*Primary Examiner*—John M. Jillions
*Attorney, Agent, or Firm*—Watson, Cole

[57] ABSTRACT

Chrominance component signals of two different types are produced such that the chrominance signals alternate within a field and between adjacent fields in order to provide an improved amount of information from which to enhance the vertical chrominance resolution of a television receiver. The appropriate chrominance structure is either provided by a special source or else a conventional source is filtered in order to produce the appropriate structure. The filter comprises two portions, one for filtering chrominance signals of a first type from a first field and one for filtering chrominance signals of a second type from the first field in order to provide interpolated signals. A specific filter structure is disclosed which may be used for either pre- or post-filtering.

4 Claims, 6 Drawing Figures u v u v u v u v u v u v u v u v u v u v

```
 -21      -21         -21    -21
 -48      -48                        -48      -48
 -43  84 -43         -43    -43             84
      256                256
  64 426 64           64     64            428
  96 512 96                 512        96  *  96
  64 428 64           64     64            428
      256                256
 -43  84 -43         -43    -43             84
 -48      -48                        -48    -48
 -21      -21        -21    -21
      (a)                (b)                  (c)
```

METHOD AND APPARATUS FOR ENHANCING VERTICAL CHROMINANCE RESOLUTION

BACKGROUND OF THE INVENTION

1. Field of the Invention

The present invention relates to the transmission and reception of color television signals in component form and more particularly to a method an apparatus for handling the chrominance components of the signals.

The present invention will be described in relation to a component television signal known as a Multiplexed Analogue Component (M.A.C.) signal although this is but one application of the present invention.

SUMMARY OF THE INVENTION

The present invention provides a method of assembling chrominance components signals comprising providing a plurality of fields of video signals in which the two different types of chrominance component signals alternate within each field, and arranging the fields so as to produce a resultant chrominance structure which is noninterlaced and contains alternate chrominance component signals both within each field and between adjacent fields, whereby to permit enhanced vertical chrominance resolution.

Features and advantages of the present invention will be apparent from the following description of an embodiment thereof when taken in conjunction with the accompanying drawings, in which:

DETAILED DESCRIPTION

Figure 1:
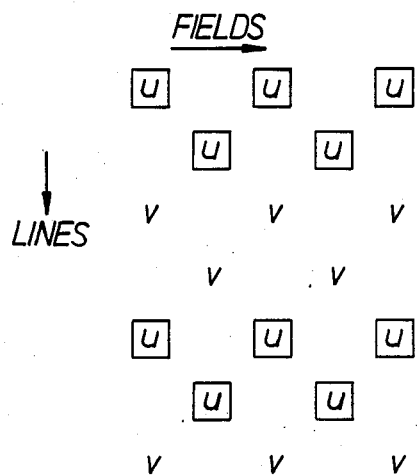
FIG. 1 shows diagrammatically the line structure for the chrominance components of a MAC-type signal.

MAC is defined to code the two color difference components (U and V in Europe) on alternate lines with a frame-reset sequence. This sequence is illustrated in FIG. 1.

There are sound reasons why this sequence has been selected in place of the alternative four-field sequence which is not reset each frame. The main reason is the residual alias components in the frame-reset case are much less disturbing. In addition, if such a signal were ever to be processed in the studio then its two-field sequence would be easier to handle than a four-field sequence. An implication of using this sequence however is that the vertical chrominance resolution is limited to a quarter of the luminance vertical resolution capability. This is because effectively there are only 144 (575/4) vertical samples of each colour in an active picture scan whereas there are 575 active vertical samples of luminance. In order to achieve the full vertical resolution afforded by the 575 lines, field stores are required in the receiver. Nevertheless even if this complexity is allowed for color the vertical chrominance resolution is still limited to that offered by 144 lines.

Figure 2:
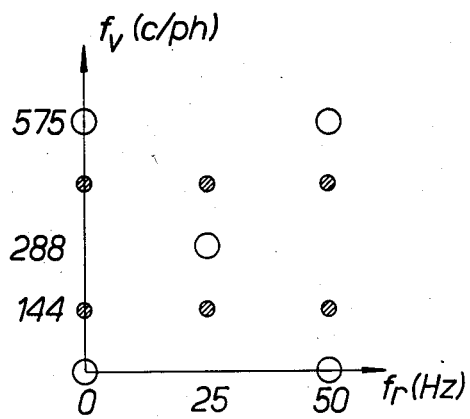
FIG. 2 shows a graph representing the repeat spectra in vertical and temporal frequency produced by the line structure of FIG. 1.

In frequency terms this limitation is evident by considering the repeat spectra (in vertical and temporal frequency) generated by this alternate line sequence, as illustrated in FIG. 2.

The open circles are those repeats arising from the 625 interlace scan. The extra repeats introduced by alternate line omission in a frame reset fashion are illustrated by the shaded circles. These repeat spectra are half-amplitude but nevertheless they impose a Nyquist-limiting vertical chrominance frequency of 72 cycles per picture height (equivalent to 1.8 MHz horizontally). In practice the chrominance vertical resolution obtained after pre- and post- filtering is equivalent to 1.1 MHz horizontally ($-3$ dB).

If we wish to maintain a frame-reset sequence for transmission, techniques for achieving a vertical chrominance resolution greater than the Nyquist limit described above are not obvious. Nevertheless the following line of thought gives a clue to a possibility: with the current approach there appears to be a paradox. Although there are half as many lines of each colour difference component as there are of luminance, the available vertical resolution is only a quarter as great. As we have seen, this is due to the sampling structure formed by the chrominance lines. If we conceive of a chrominance line structure which is analogous to the luminance structure, except that it is halved in density vertically, then we arrive at a 312½-line interlace structure. Two such structures (one for each colour difference component) are illustrated interleaved in FIG. 3.

In this case there are 288 (575/2) vertical samples of each colour difference component, just as there are 575 for the luminance. In frequency terms, the repeat spectra appropriate to such a line-structure are shown in FIG. 4.

In this case the "Nyquist-limit" vertically is 144c/ph (equivalent to 3.7 MHz horizontally). As with the luminance, field store processing is required in order to achieve this increased resolution.

Figures 3, 4:
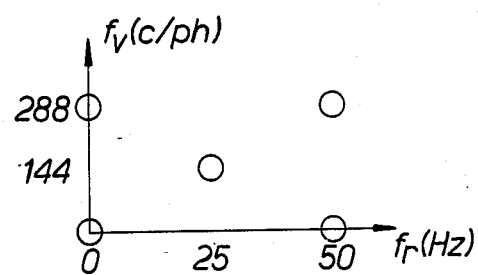
FIG. 3 shows diagrammatically the proposed type of line structure.
FIG. 4 shows a graph representing the repeat spectra in vertical and temporal frequency produced by the line structure of FIG. 3.

The relationship between the line-structure of FIG. 3 and the MAC frame-reset structure of FIG. 1 is a simple one. A vertical shift upwards of alternate fields in the interlace structure (FIG. 3) by a "frame-line" (i.e. 1/575 of a picture height) yields the frame-reset structure (FIG. 1). It is thus possible for a 312½ line interlaced colour structure (FIG. 3) to be transmitted in a 625-interlace alternate-line frame-reset format (FIG. 1). A "conventional receiver" would process these colour lines as a true frame-reset structure (thus alternate fields would have a minor vertical shift) while a higher definition receiver would treat the lines as being part of the 312½ line interlaced structure and thus achieve an increased vertical resolution.

A higher definition receiver would receive the FIG. 3 chrominance structure and undertake scan conversion to derive a 312½ line non-linterlaced structure. This provides a greater basis of information for subsequent vertical interpolation to provide a 625 line non-interlaced chrominance structure for combination with the 625 line non-interlaced luminance structure such a receiver would also produce.

Figures 5, 6:
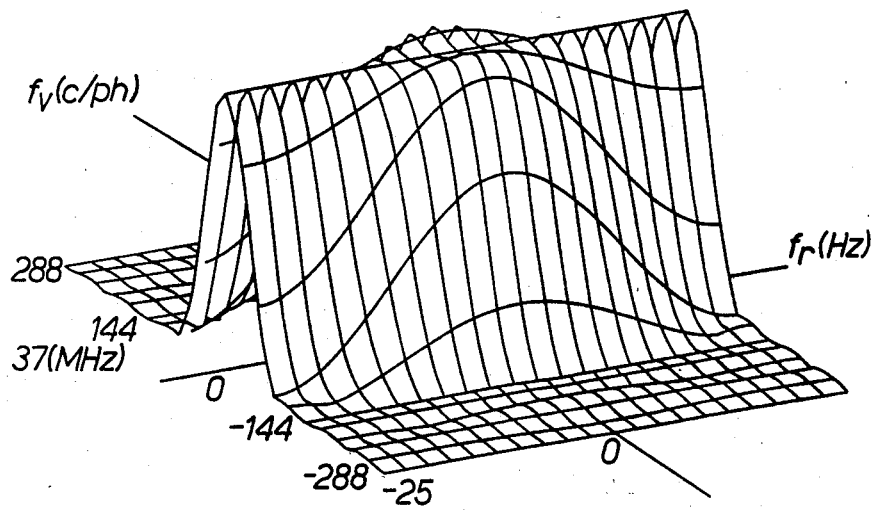
FIG. 5 shows a diagrammatic representation of a filter producing the line structure shown in FIG. 3.
FIG. 6 shows the characteristic of the filter shown in FIG. 5.

If the source of chrominance signals is a special source such as a special camera, it is possible for the chrominance structure as shown in FIG. 3 to be available directly from the source. If the source scans with the basic 625 line inter-laced structure then the lines in alternate fields of the colour structure of FIG. 3 are not available. In this case, therefore, values need to be interpolated. This interpolator can be the prefilter which shapes the vertical-temporal frequency spectrum of the color components. As an example such a prefilter has been designed which would offer a −3 dB vertical bandwidth equivalent to 2.14 MHz (on stationary or horizontally moving pictures). The filter coefficients are defined on a grid of 625-sequential-scan lines as illustrated in FIG. 5a, although in practice it will mean that "real lines" are filtered by the coefficients of FIG. 5b and "interpolated lines" are provided by using the coefficients of FIG. 5c. The vertical-temporal frequency response of such a filter is illustrated in FIG. 6. If a similar post-filter is used prior to sequential i.e. non-interlace display in a higher definition receiver then the combined filter responses give a vertical resolution for stationary or horizontally moving scenes equivalent to 1.9 MHz (−3 dB). For vertically moving pictures this is reduced and in the worst case (having a 25 Hz temporal frequency component) the combined response gives a resolution equivalent to 0.6MHz (−3 dB). This is of course just an example. A different filter could be used or indeed one or both of the filters could be adaptive.

The effect on a conventional receiver would be primarily that of less severe pre-filtering. The results obtained would be more like those obtained with a 1-1 pre-filter rather than with a typical alias-rejecting seven-tap pre-filter.

By using the presently proposed invention, a 625 line MAC system can provide a vertical chrominance resolution that approaches, if not equals that of a 1125 line H DTV system in its transmission format.

I claim:

1. A method of producing a color television signal in component form, comprising the steps of:
    scanning a scene;
    generating luminance and two types of color difference component signals representing the scene such that each luminance or color difference component signal relates to a line in one of a plurality of fields of a television display of the scene, the luminance component signals relate to every other line in one field of each frame and to every other line in the other field of each frame of the television display of the scene, said every other line in one field being interlaced with said every other line in the other field, the color difference component signals relate to every other line in each field of the television display of the scene, the color difference component signals relating to each every other line in each field alternate in type, the color difference component signals relating to lines in said one field of each frame relate to the same lines as the luminance component signals relating to said one field of each frame of the television display of the scene, the color difference component signal relating to the first line in said one field of each frame is of a different type from the color difference component signal relating to the first line of said other field of each frame of the television display, and the color difference component signals relating to the first of said every other lines in each frame are controlled to be of the same type:
    time multiplexing luminance and color difference component signals to form a color television signal in component form; and
    the generated color difference component signals relating to said other field of each frame of the television display relate to different lines from the luminance components relating to said other field of each frame.

2. A method according to claim 1, wherein the scanning step comprises raster scanning the scene using a two-field line-interlaced scan, and the generating step comprises generating luminance and two types of color difference component signals indicative of parameters of the scanned lines, and passing the color difference component signals through a filter to alter the lines in said other field of each frame of a television display of the scene to which the color difference component signals relate.

3. A method according to claim 2, wherein the step of passing the color difference component signals through a filter comprises passing the color difference component signals through a filter acting on the vertical temporal frequency spectrum of the color difference component signals.

4. A method of receiving a color television signal in component form comprising time-multiplexed luminance and color difference component signals representing a scene, each luminance or color difference component signal relating to a line in one of a plurality of fields of a television display of the scene, comprising the steps of:
    receiving a color television signal in component form;
    demultiplexing the luminance and two types of color difference component signals in the received signals, the demultiplexed luminance component signals relating to every other line in one field of each frame and to every other line in the other field of each frame of the television display of the scene, said every other line in one field being interlaced with said every other line in the other field, the demultiplexed color difference component signals relating to every other line in each field of the television display of the scene, the demultiplexed color difference component signals alternating in type within each field, the demultiplexed color difference component signals relating to the same lines in said one field of each frame of the television display as the demultiplexed luminance component signals, the demultiplexed color difference component signal relating to the first line in said one field of each frame being of a different type from the demultiplexed color difference component signal relating to the first line in said other field of each frame of the television display, and the demultiplexed color difference component signals relating to the first of said every other line in each frame being controlled to be of the same type;
    outputting the luminance and two types of color difference component signals to a television display;
    the demultiplexed color difference component signals relating to said other field of each frame relate to the same lines as the color difference component signals relating to said one field of each frame of the television display of the scene; and
    further comprising the step of interpolating using the demultiplexed color difference component signals to obtain further color difference component signals, the further color difference component signals relating to lines in the frame different from the demultiplexed color difference component signals.

* * * * *